(12) United States Patent
Woo et al.

(10) Patent No.: US 12,393,333 B2
(45) Date of Patent: Aug. 19, 2025

(54) STORAGE DEVICE REORGANIZING DATA AND RELATED OPERATING METHOD

(71) Applicant: SAMSUNG ELECTRONICS CO., LTD., Suwon-si (KR)

(72) Inventors: Sang Oak Woo, Suwon-si (KR); Chang Hyun Lee, Suwon-si (KR); Jun Bum Park, Suwon-si (KR)

(73) Assignee: Samsung Electronics Co., Ltd.

( * ) Notice: Subject to any disclaimer, the term of this patent is extended or adjusted under 35 U.S.C. 154(b) by 66 days.

(21) Appl. No.: 18/107,029

(22) Filed: Feb. 8, 2023

(65) Prior Publication Data

US 2023/0325076 A1  Oct. 12, 2023

(30) Foreign Application Priority Data

Mar. 24, 2022 (KR) .................. 10-2022-0036826

(51) Int. Cl.
*G06F 3/06* (2006.01)
(52) U.S. Cl.
CPC .......... *G06F 3/0604* (2013.01); *G06F 3/0656* (2013.01); *G06F 3/0673* (2013.01)
(58) Field of Classification Search
None
See application file for complete search history.

(56) References Cited

U.S. PATENT DOCUMENTS

| | | | |
|---|---|---|---|
| 7,155,572 B2 | 12/2006 | Hughes et al. | |
| 7,522,171 B1 | 4/2009 | Nordquist | |
| 10,176,621 B2 | 1/2019 | Cerny et al. | |
| 10,761,819 B2 | 9/2020 | Gong et al. | |
| 11,036,502 B2 | 6/2021 | Grocutt | |
| 2006/0106980 A1* | 5/2006 | Kobayashi | G06F 3/0659 711/113 |
| 2007/0291749 A1* | 12/2007 | Taki | H04L 69/168 370/356 |
| 2013/0057562 A1 | 3/2013 | Nordlund et al. | |
| 2017/0091204 A1* | 3/2017 | Minwalla | H04L 41/12 |
| 2017/0242590 A1* | 8/2017 | Gokhale | G06F 12/0223 |
| 2019/0096027 A1* | 3/2019 | Fielding | G06F 12/0811 |
| 2020/0065177 A1* | 2/2020 | Li | G06F 9/546 |

(Continued)

FOREIGN PATENT DOCUMENTS

EP  3964949  3/2022

OTHER PUBLICATIONS

European Search Report in European Appln. No. 23152175.8, mailed on Jul. 21, 2023, 4 pages.

(Continued)

*Primary Examiner* — Arpan P. Savla
*Assistant Examiner* — Edmund H Kwong
(74) *Attorney, Agent, or Firm* — Fish & Richardson P.C.

(57) ABSTRACT

An electronic system includes; a host providing a command and source data having a source data structure, a computing resource device operating in relation to destination data having a destination data structure different from the source data structure, and a storage device. The storage device receives the command from the host and includes a storage medium storing the source data, and a data reorganizing unit converting the source data into reorganized source data, wherein the storage device outputs the reorganized source data to the computing resource device as destination data.

20 Claims, 9 Drawing Sheets

(56) References Cited

U.S. PATENT DOCUMENTS

2021/0042057 A1    2/2021  Park et al.
2021/0150770 A1    5/2021  Appu et al.
2021/0191647 A1    6/2021  Muthiah
2021/0373895 A1*  12/2021  Shahim ................ G06F 3/0679

OTHER PUBLICATIONS

Office Action in European Appln. No. 23152175.8, mailed on Aug. 2, 2023, 7 pages.

* cited by examiner

FIG. 8

Source data structure
- number of vertex=100
- number of attributes=3
- 1$^{st}$ attribute = 3 components
- 2$^{nd}$ attribute = 4 components
- 3$^{rd}$ attribute = 2 components

| Attributes | Offset | Stride | component size |
|---|---|---|---|
| Position[0] | 0 | 20 | 2 |
| Position[1] | 2 | 20 | 2 |
| ... | ... | ... | ... |
| Color[0] | 8 | 20 | 1 |
| ... | ... | ... | ... |
| Normal[1] | 16 | 20 | 4 |

FIG. 9

Destination data structure

| Attributes | Offset | Stride | component size |
|---|---|---|---|
| Position[0] | 0 | 0 | 2 |
| Position[1] | 200 | 00 | 2 |
| ... | ... | ... | ... |
| Color[0] | 800 | 0 | 1 |
| ... | ... | ... | ... |
| Normal[1] | 1600 | 0 | 4 |

FIG. 10

| Components | Destination Addr | Source Addr | Sending count | Receiving count | Valid |
|---|---|---|---|---|---|
| Position[0] | 0 | 0 | 0 | 0 | T |
| Position[1] | 200 | 2 | 0 | 0 | T |
| ... | ... | ... | ... | ... | ... |
| Color[0] | 800 | 8 | 0 | 0 | T |
| ... | ... | ... | ... | ... | ... |
| Normal[1] | 1600 | 16 | 0 | 0 | T |

STORAGE DEVICE REORGANIZING DATA AND RELATED OPERATING METHOD

BACKGROUND

1. Field of the Invention

The inventive concept relates generally to storage devices, and particularly to storage systems including a non-volatile memory device.

2. Description of the Related Art

In many contemporary data processing systems data is communicated from a storage device to a processing device through a host device. However, more recently, data communication techniques have been proposed that communicate data directly from a storage device to a processing device without intervention by a host device.

Of further note, the structure (or format) of data processed by the processing device and the structure of data stored by the storage device may be different or heterogenous in nature. Accordingly, depending on operating characteristics of the processing device, such disparate data structures may materially affect the overall performance of the data processing system. For example, in a Single Instruction Multiple Data (SIMD) system, data having a Structure of Array (SoA) structure enables more efficient memory access, as compared with data having an Array of Structure (AoS) structure.

In data processing systems wherein a storage device and a processing device respectively operate in relation to heterogeneous data, the performance efficiency of data access operations (e.g., read and write operations) may suffer from complexity associated with the heterogeneous nature of data structures. Such inefficiency degrades overall system performance and requires the use of relatively more power.

SUMMARY

Embodiments of the inventive concept provide storage devices in which operating performance is improved by adaptively reorganizing source data in relation to a destination data structure compatible with a computing resource device.

Embodiments of the inventive concept also provide an electronic system in which an operating performance is improved by adaptively reorganizing the structure of source data in relation to a destination data structure compatible with a computing resource device In some embodiments, the inventive concept provides an electronic system including; a host providing a command and source data having a source data structure, a computing resource device operating in relation to destination data having a destination data structure different from the source data structure, and a storage device. The storage device receives the command from the host and includes a storage medium storing the source data, and a data reorganizing unit converting the source data into reorganized source data, wherein the storage device outputs the reorganized source data to the computing resource device as destination data.

In some embodiments, the inventive concept provides a storage device including; a storage medium configured to store source data having a source data structure in relation to a source address, and a data reorganizing unit configured to read the source data from the storage medium in response to a command, reorganize the source data into destination data having a destination data structure and related to a destination address, and output the destination data to a computing resource device operating in relation to the destination data structure, wherein the command includes the source address, the destination address and metadata, and the data reorganizing unit is further configured to reorganize components of the source data to generate reorganized source data, and output the reorganized source data as the destination data.

In some embodiments, the inventive concept provides an operating method for a storage device, the method including; receiving a command from a host device, decoding the command to extract a source address, a destination address, and metadata including data structure information, rearranging an access order of the source address in accordance with the destination address to generate a rearranged source address, reading source data having a source data structure from a storage medium using the rearranged source address to reorganize the source data on a component-by-component basis to generate reorganized source data, and exporting the reorganized source data to a computing resource device as destination data, wherein the destination data has a destination data structure different from the source data structure.

BRIEF DESCRIPTION OF THE DRAWINGS

Advantages, benefits and features, as well as the making and use of the inventive concept may be more clearly understood upon consideration of the following detailed description together with the accompanying drawings, in which:

FIG. 8 is a table listing characteristics of a data structure for source data in relation to the conceptual diagram of FIG. 6;

FIG. 9 is a table listing characteristics of a data structure for destination data in relation to the conceptual diagram of FIG. 7;

FIG. 10 is a table illustrating in one example a scoreboard that may be used in relation to embodiments of the inventive concept;

DETAILED DESCRIPTION

Figure 1:
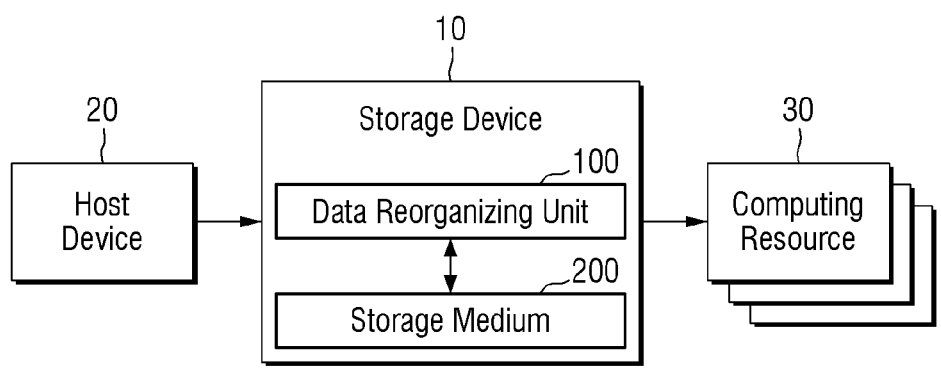
FIG. 1 is a block diagram illustrating an electronic system according to embodiments of the inventive concept.

Throughout the written description and drawings, like reference numbers and labels are used to denote like or similar elements, components, features and/or method steps. Terms such as "unit" or "module" may be used to denote functional blocks illustrated in the drawings, wherein such functional blocks may be variously implemented in hardware, firmware, and/or software.

Hereinafter, certain embodiments of the inventive concept will be described in relation to different types of data having different structures. For example, a first data type stored in a storage device may be referred to as "source data" having a "source data structure," whereas a second data type processed by a computing resource device may be referred to as "destination data" having a "destination data structure." It follows that an address corresponding to source data may be referred to as a "source address," and an address corresponding to destination data may be referred to as a "destination address." However, those skilled in the art will recognize that such designations provided for convenience of explanation, and the scope of the inventive concept is not limited thereto. Further, such designations may be alternately referred to using other names within an or equivalent scope as the inventive concept.

Hereinafter, a storage device according to embodiments of the inventive concept will be described in relation to FIGS. 1, 2, 3, 4, 5, 6, 7, 8, 9, 10, 1, 12 and 13 (hereafter collectively, "FIGS. 1 to 13").

Figure (FIG. 1 is a block diagram illustrating an electronic system 1 according to embodiments of the inventive concept.

Referring to FIG. 1, the electronic system 1 may generally include a storage device 10, a host device 20, and at least one computing resource device 30 (hereafter singularly or collectively referred to as a "computing resource device").

The electronic system 1 may be configured to perform various functions in a semiconductor system, wherein the semiconductor system may be incorporated (or applied to) a variety of devices, such as for example, a drone, a robot (e.g., an advanced drivers assistance system (ADAS)), a smart television, a smart appliance, a smart phone, a medical device, a mobile device, an image display device, a measuring device, and an Internet of Things (IoT) device.

In some embodiments, the host device 20 may control overall operation of the electronic system 1, as well as operation of various constituent components of the electronic system 1. The host device 20 may be variously implemented, for example, as a general purpose processor, a dedicated processor, and an application specific processor. The host device 20 may include one or more CPU cores, and may further include a host controller (not shown) configured to control the storage device 10. In some embodiments, the host device 20 may further include an accelerator block including dedicated circuitry capable of performing high-speed data computations, such as those routinely associated with artificial intelligence (AI) computations.

Alternately, in some embodiments, the host device 20 may correspond to a Central Processing Unit (CPU), a processor, a microprocessor, an application processor (AP), or the like. In some embodiments, the host device 20 may be implemented as a system-on-chip (SoC). The host device 20 may be configured as a mobile system (e.g., a mobile phone, a smart phone, a tablet personal computer (PC), a wearable device, a healthcare device, an IoT device, a laptop PC, a server, a media player, a vehicle-based device (e.g., such as navigation system), etc.). In some embodiments, the host device 20 includes a communication system or device (not shown) that may be used to communicate (e.g., transmit and/or receive) various signals to/from devices external to the host device 20 using one or more communication protocols. Thus, the communication device may be a device providing hardwired and/or wireless connection(s), and may include, for example, an antenna, a transceiver, and/or a modem. In some embodiments, the communication device associated with the host device 20 may provide connection to an Ethernet network, as one example of a wireless communication network.

The computing resource device 30 may be a device generally capable of receiving data from the storage device 10, and thereafter variously processing the received data. Accordingly, the computing resource device 30 may include at least one of a cache memory, a volatile memory, and a non-volatile memory capable of storing the received data.

In some embodiments, the computing resource device 30 may include at least one of, for example; a processing unit, processing core(s) associated with a processing unit, a Multi-Format CODEC (MFC), a video module, a camera interface), a Joint Photographic Experts Group (JPEG) processor, a video processor, a mixer, a three-dimensional (3D) graphics core, an audio system, a driver, a display driver, a volatile memory, a non-volatile memory, a memory controller, an input and/or output (I/O) interface block, and a cache memory. As variously implemented (e.g., as a Graphic Processing Unit (GPU) or a Neural Processing Unit (NPU)), the computing resource device 30 may be configured to process destination data.

Further in this regard, the storage device 10 may be configured to receive a command from the host device 20, and execute one or more operation(s) in response to the command. Thus, the command may relate to a read operation that reads indicated source data from the storage device 10 and communicate the resulting "read data" to the computing resource device 30. Alternately, the command may relate to a write (or program) operation that writes "write data" received from the host device 20 to the storage device 20 as the source data.

In some embodiments, the storage device 10 reads source data in response to a source address, and then reorganizes the structure of the source data in accordance with a destination data structure compatible with the computing resource device 30. This approach essentially generates "reorganized source data" that may be communicated to, and subsequently processed by the computing resource device 30. That is, the storage device 10 provides (or outputs) the reorganized source data as destination data having a destination data structure to the computing resource device 30 in accordance with a destination address.

Accordingly, in some embodiments, the storage device 10 may be understood as generally including a data reorganizing unit 100 and a storage medium 200.

Here, the storage medium 200 may be used to store source data received from at least the host device 20, wherein the source data may be stored in accordance with the source data structure at location(s) in the storage medium 200 indicated by source address(es) (e.g., a start source address and a last source address).

The data reorganizing unit 100 may be used to decode command(s) received from the host device 20, rearrange an order of source addresses in accordance with the destination address to thereby generate "rearranged source address(es)", and access the storage medium 200 in response to the rearranged source addresses in order to read source data from the storage medium 200. In some approaches, the source data may be read in relation to one or more component(s) in accordance with one or more attribute(s), wherein the read component(s) may be placed (or arranged) in accordance with the destination data structure (i.e., reorganized into the destination data structure). Thus, following generation of the reorganized source data as appropriately structured destination data, the data reorganizing unit 100 may communicate the resulting destination data to the computing resource device 30 in accordance with the destination address.

Further in view of the foregoing, the data reorganizing unit 100 may be understood as performing a rearranging operation in relation to components of the source data stored in the storage medium 200.

In some embodiments, the data reorganizing unit 100 may be implemented, wholly or in part, as a storage controller for the storage device 10.

Figure 13:
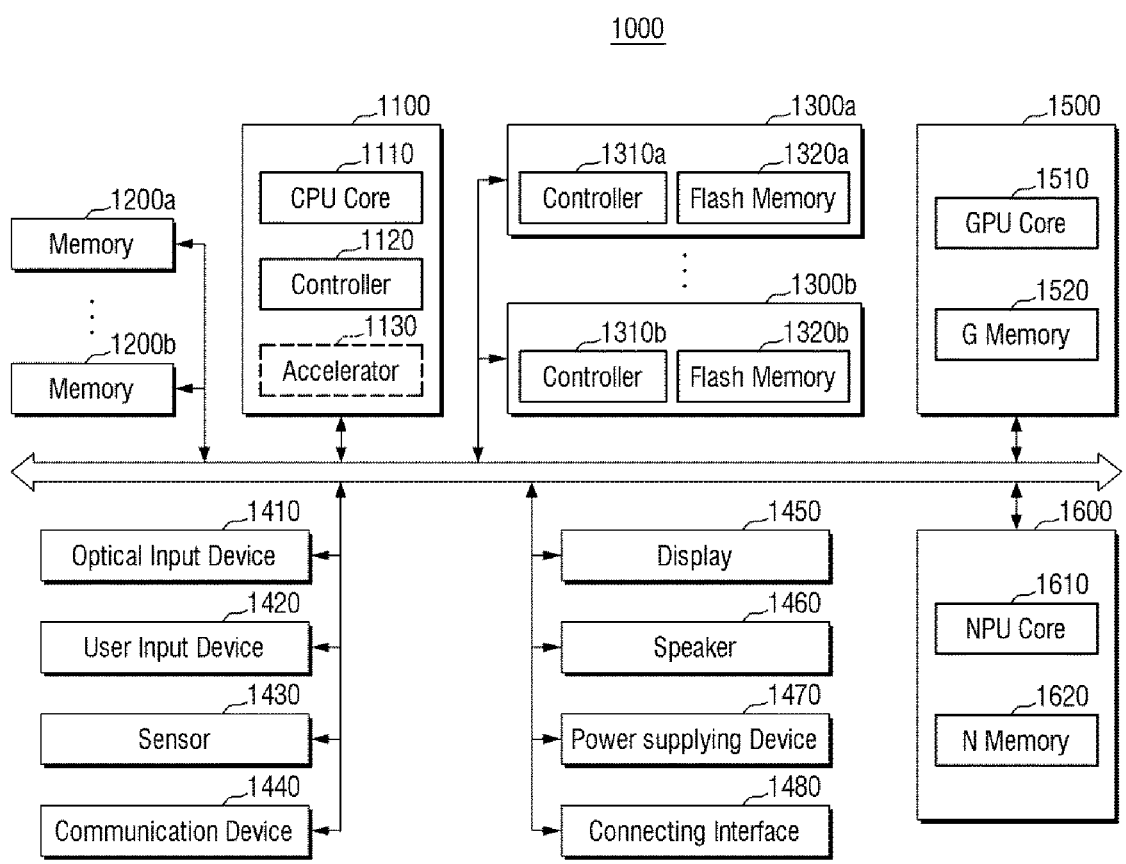
FIG. 13 is a block diagram illustrating a system including a storage device according to embodiments of the inventive concept.

In some embodiments, the storage device 10 may be implemented as a component in a data center or as an AI learning device. (For example, as illustrated in FIG. 13, a smart storage device 1000 may be a semiconductor device such as a processing-in-memory (PIM) or a computing-in-memory (CIM) capable of storing data and performing computations).

Referring to FIG. 1, the storage medium 200 may include at least one of, for example; a non-volatile memory, a Solid State Drive (SSD), an embedded memory, and a detachable external memory. For embodiments wherein the storage medium 200 is implemented as a SSD, the storage medium 200 may be configured and operated in accordance with one or more conventionally-understood and commercially available technical standards such as the non-volatile memory express (NVMe) standard and the Computer eXpress Link (CXL) standard. And for embodiments wherein the storage medium 200 is implemented as an embedded memory or an external memory, the storage medium 200 may be configured and operated in accordance with one or more conventionally-understood and commercially available technical standards such as the Universal Flash Storage (UFS) standard and the embedded Multi-Media Card (eMMC) standard.

Figure 2:
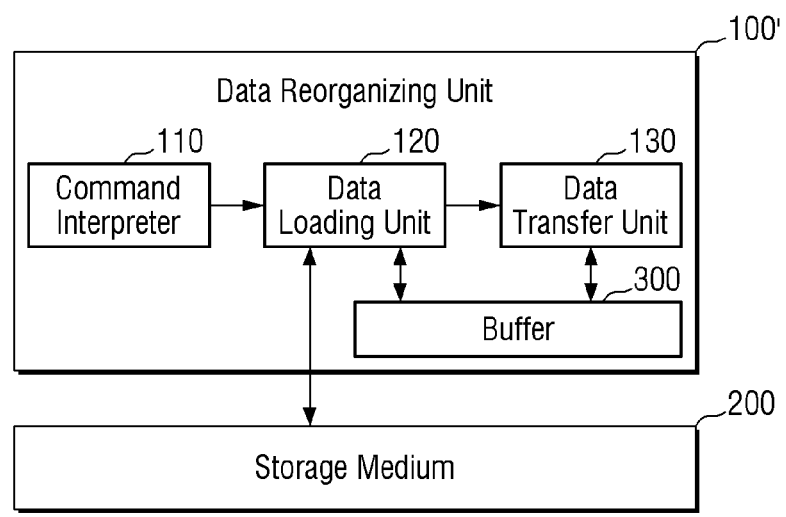
FIGS. 2 and 3 are respective block diagrams further illustrating examples of the data reorganizing unit 100 of FIG. 1.
Figure 3:
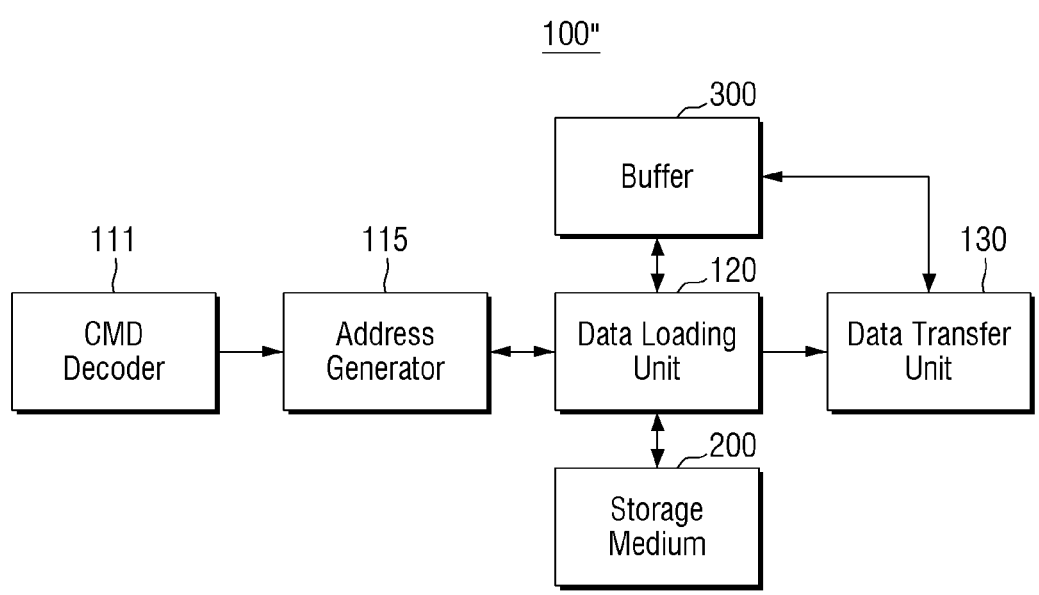

FIGS. 2 and 3 are respective block diagrams further illustrating various examples (100' and 100") of the data reorganizing unit 100 of FIG. 1.

Referring to FIGS. 1 and 2, the data reorganizing unit 100' may include a command interpreter 110, a data loading unit 120, a data transfer unit 130, and a buffer 300.

The command interpreter 110 receives command(s) from the host device 20 and interrupts same. That is, the command interpreter 110 may interpret a source address, a source data structure, a destination address, and/or a destination data structure derived from received command(s). In some embodiments, various commands may include at least one address and metadata. For example, an address included in a command may include a start address and an end address Further in this regard, metadata may be used to convey information regarding a data structure associated with various data, such as "read data" to be retrieved from the storage medium 200 or "write data" to be written (or programmed) to the storage medium 200 (hereafter referred to generically as "data structure information"). For example, data structure information may include; a number of attributes, type of attributes, a number of components for each attribute, as well as various offset(s), stride(s) and/or component size(s), etc. Here, the term "offset" denotes a distance between addresses, the term "stride" denotes a distance between a current vertex and a next vertex, and the term "component size" denotes a number of bits, or a number of bytes, etc.

In some embodiments, the data structure information may further include format conversion information. Here, the term "format conversion information" denotes information that replaces a first offset and a first stride for each source data component with a second offset and a second stride associated with a data structure of destination data. In some embodiments, the format conversion information may be information obtained by a defined function, or information obtained from an established table.

The data loading unit 120 may be used to read (or retrieve) source data stored in the storage device 10 and perform a data reorganization operation in order to adaptively convert the source data structure into a corresponding destination data structure compatible with the computing resource device 30. Thus, the data loading unit 120 may be understood generating the destination data by reorganizing source data retrieved from the buffer 300.

In this regard, the data loading unit 120 may rearrange source addresses in accordance with an order of accessing from the storage medium 200 in accordance with the destination address. That is, the data loading unit 120 may read source data from the storage medium 200 using the rearranged source address(es) and store component(s) for each of the read attribute(s) in the buffer 300.

Accordingly, the buffer 300 may be used to store the destination address and the destination data corresponding to the destination address. For example, the destination data may be generated by reorganizing the data structure by storing each component of the source data at the position of the attribute and component corresponding to the destination data structure.

Thus in some embodiments, the data loading unit 120 may convert source data into the destination data according to an order of rearranged source addresses and in accordance with the source data structure, the destination data structure, and the format conversion information.

In some embodiments, the data loading unit 120 may further include a so-called scoreboard, wherein the "scoreboard" may be used to indicate whether reorganization of source data into destination data corresponding to a destination address has been completed. For example, the scoreboard may be used to determine (or check) whether a destination address has been received, whether the received source address corresponds to the destination address, and whether component extraction for each attribute has been completed. In this regard, examples of a scoreboard that may be used in relation to certain embodiments of the inventive concept will be described hereafter in some additional detail with reference to FIGS. 3 and 10.

Once the destination data has been stored in the buffer 300, the data transfer unit 130 may be used to export (or output) the destination data stored in the buffer 300 to the computing resource device 30.

Referring to FIG. 3, the data transfer unit 100" may include a command decoder 111, an address generator 115, a data loading unit 120, a data transfer unit 130, a storage medium 200, and a buffer 300. Here, the data transfer unit 100' of FIG. 3 may have different configurations of the command decoder 111 and the address generator 115, as compared with the data transfer unit 100 of FIG. 2.

The command decoder 111 may be used to receive the command from the host device 20 and decode same. In this regard, the command decoder 111 may generate an internal command associated with operation(s) to-be-performed by the storage device 10 in response to the command. For example, the internal command may be a read request, a write request, etc., provided to the storage medium 200. The command decoder 111 may also be used to analyze metadata included in the command.

The address generator 115 may be used to receive source address(es) and destination address(es) derived from (or related to) the decoded command. However, the address generator 115 need not store source addresses in the order received from the command decoder 111, but rather, may rearrange the order of the source addresses to read the components of the source data in an order according to the destination addresses. That is, the address generator 115 rearranges the order of the source addresses on the basis of the destination address. Further, the address generator 115 may "map" the destination addresses and the rearranged source addresses and output same to the data loading unit 120.

In some embodiments, when the destination address is received, the address generator 115 determines whether sufficient, available memory space exists in the buffer 300. With regard to available memory space in the buffer 300, the data loading unit 120 may set a flag indicating whether or not data may be stored in the buffer 300 by the address generator 115. Accordingly, in response to the flag the address generator 115 may stop a source address rearrangement operation when the buffer 300 lacks sufficient available memory space, and resume the stopped source address rearrangement operation in response to the flag when the buffer 300 has sufficient available memory space.

As noted above in some embodiments, the address generator 115 may further include a scoreboard, wherein the scoreboard may be used to identify factors or events associated with one or more source data reorganization operations. For example, the scoreboard may be used to track completion of various factor(s) and/or event(s). Thus, the scoreboard may be implemented using a number of flip-flop(s), for example.

In this regard, the scoreboard may be used to track whether reorganization of destination data corresponding to the destination address has been completed. Thus, the scoreboard may include a number of entries, wherein the number of entries varies by design. For example, the scoreboard may include a destination address, a source address, a sending count, and a receiving count corresponding to each component for each entry, and may calculate valid information according to the various entries.

The data loading unit 120 may be used to receive the destination address, the rearranged source address(es), the source data structure, the destination data structure, the format conversion information, as well as internal command(s) received from the address generator 115.

The data loading unit 120 may read the source data corresponding to the rearranged source address(es) from the storage medium 200 and perform a data loading operation. For example, the data loading unit 120 may load the rearranged source address(es) into a queue and then remove the rearranged source address(es) one-by-one from the queue according to a first-in/first-out basis, as the source data is read from the storage medium 200.

Before reading the source data, the data loading unit 120 determines whether the buffer 300 has sufficient available memory space in relation to the destination address. For example, the data loading unit 120 may determine a size of the destination data on the basis of the destination start address and the destination last address. Thus, the size of the destination data may be determined on the basis of the destination address, and may then be compared with the remaining memory space of the buffer 300 in order to determine whether or not data loading and reorganizing operations may be performed. When the size of the destination data is greater than the remaining available memory space of the buffer 300, the data loading unit 120 may set the flag to a possible state-which may then be read by the address generator 115. However, when the size of the destination data is less than the remaining available memory space of the buffer 300, the data loading unit 120 may set the flag to impossible state-which may be read by the address generator 115.

The data loading unit 120 may store the destination address received from the address generator 115 in the buffer 300, and the buffer 300 may map the destination address to a request identification (ID) corresponding to an internal command. The buffer 300 may then store the destination address accordingly. For example, before reading source data, when the source address stored in the buffer 300 is equal to the source address output from the input queue, the data loading unit 120 may record a number of times that the request ID for the same source address in the input queue has been used, and store the destination address corresponding to the recorded request ID in the buffer 300. That is, the buffer 300 may map and record the request ID in relation to the destination address.

The data loading unit 120 may send the read request to the storage medium 200 for the source data corresponding to the source address of the request ID, and the storage media may read the source data for each component according to the read request. The data loading unit 120 arranges the components at the corresponding positions to correspond to the request ID and the format conversion information recorded in the buffer 300 for each component. The data loading unit 120 reorganizes each component in accordance with the attribute order of the destination data structure in order to generate the destination data. Examples of differences in data structure and reorganization of the source data and the destination data will be described hereafter in some additional detail with reference to FIGS. 4, 5, 6, 7, 8 and 9.

In some embodiments, the data loading unit 120 may not communicate a read request to the storage medium 200 from a second read request in relation to a redundant source address corresponding to the same request ID. Therefore, the data loading unit 120 may generate destination data with the minimum number of data access operations, and may therefore reduce a total number of accesses required for reorganizing of the destination data with respect to the source data associated with the same source address.

The address generator 115 may be used to determine whether there is still a component to be read for the component having a smallest destination address (e.g., position component) among the destination addresses received on the basis of the valid information. If the valid information is invalid (False, F), the read request to the component (e.g., referred to as a Position[0] component) is sent to the data loading unit 120. If the valid information is valid (Truth, T), the address generator 115 changes the destination address to the next destination address and updates the sending count (e.g., increases the count value).

The data transfer unit 120 writes the Position[0] component read from the storage medium 200 to the buffer 300, and if all the Position components are written to the buffer 300 are valid (e.g., all are filled), the data transfer unit 120 sends the data to the data transfer unit 130, and also sends an acknowledge (Ack) signal indicating completion of the transfer to the address generator 115. Upon receiving the Ack signal, the address generator 115 updates the receiving count of the component (e.g., Position) corresponding to the Ack signal. The address generator 115 disables a component (e.g., Position) in which the sending count and the receiving count become the same.

The address generator 115 may check progress of the data reorganization operation by repeating the foregoing method while checking valid information for other components of the current destination address.

The data transfer unit 130 receives the destination data and the destination address from the data loading unit 120 and exports them to the computing resource device 30.

Figure 4:
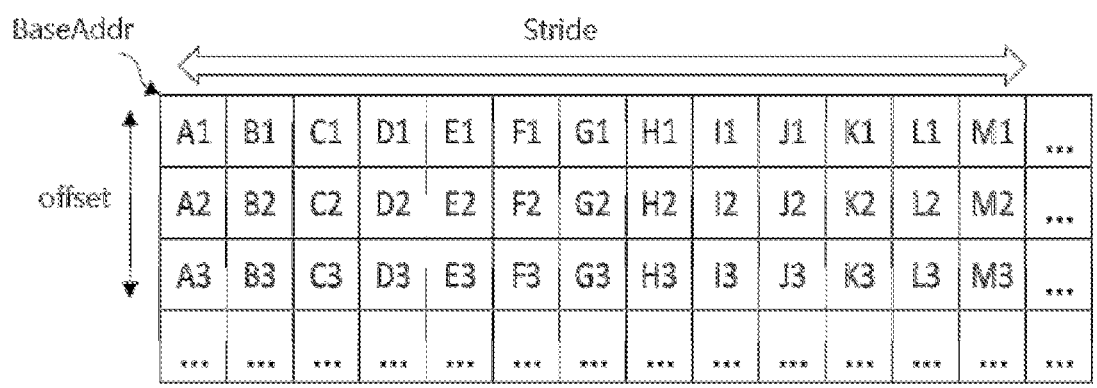
FIGS. 4, 5, 6 and 7 are conceptual diagrams variously illustrating data structures associated with source data and/or destination data according to embodiments of the inventive concept.
Figure 5:
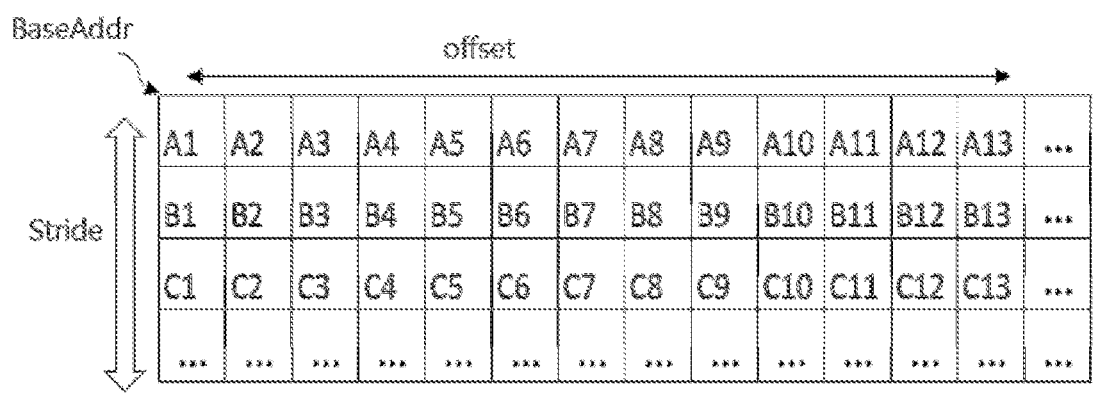

FIGS. 4 and 5 are respective conceptual diagrams illustrating a source data structure and destination data according to embodiments of the inventive concept. Here, it is assumed that the storage medium 200 reads source data in a horizontal direction, and that the computing resource device 30 reads destination data in a vertical direction.

Referring to FIG. 4, the source data may be stored as an AoS (Array of Structure) structure. The source data may be arranged for each attribute in the horizontal direction from a base address corresponding (e.g.) to the source data start address, and may be arranged for each component of the attribute in the vertical direction.

In the illustrated example of FIG. 4, the source data structure is arranged in the horizontal direction in an order of attributes A, B, C, D, E, and F from the base address, and further arranged in the vertical direction in an order of components A1, A2, A3, and A4 for each attribute Thus in relation to a first attribute 'A', various related components are vertically indicated as A1, A2, A3, etc.

An offset for the source data indicates an extent (or distance) to which the start point of the source data that performs the current operation is separated from the base address. For example, the vertical distance between the addresses of the components A1 and A2 for the attribute A may be referred to as an offset. In the illustrated example of FIG. 4, the offset of component A2 may be 1 from the base address, and the offset of component A3 may be 2 from the base address.

A stride for the source data may be understood as a distance associated with a read operation unit or a write operation unit in relation to the storage medium 200. Hence, a stride may refer to a distance between the start point of the first source data of the current source address and the start point of the second source data of the next source address. For example, the first source data may include components A1 to M1, the second source data may include components A2 to M2, therefore the stride may extend from A1 to M1. Hence, in the illustrated example of FIG. 4, the stride of component A1 in the first source data may be 7 (or A1 to M1).

Referring to FIG. 5, the destination data structure may be different from the source data structure. For example, the destination data may be stored using a Structure of Array (SoA) structure. The destination data may be arranged for each component of the attribute in the horizontal direction from the base address which is the destination start address, and may be arranged for each attribute in the vertical direction.

The offset of the destination data is calculated in the horizontal direction. For example, the offset of component A1 from the base address may be 0, the offset of component A2 may be 1, and the offset of component A3 may be 2.

The stride of the destination data may be calculated in the vertical direction, which is the direction of the components A1, B1, and C1, because the read operation of the computing resource device 30 is performed in the vertical direction.

Thus, in some embodiments, the command sent by the host device 10 may include a source address, a destination address, and metadata. The metadata may include information about the start address and last address of the source address and the data structure for a read operation or a write operation for modifying the data structure. In some embodiments, the data structure information may include the type of attribute in the data, the number of attributes, the number of components included in the attribute, offset information, and stride information.

The data reorganizing unit 100 may perform a data reorganization operation that converts the source data structure into a destination data structure. Examples of this approach will be described hereafter in some additional detail with reference to FIGS. 6, 7, 8 and 9.

Figure 6:
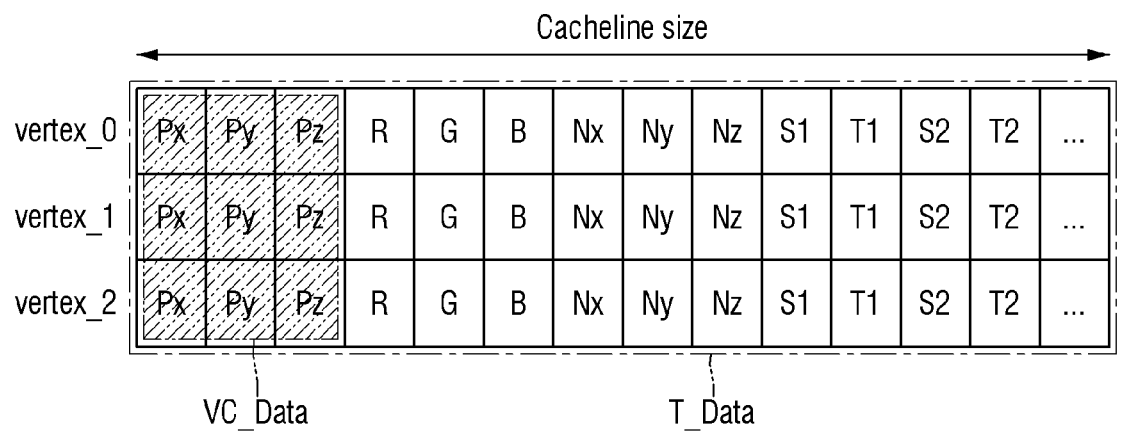
Figure 7:
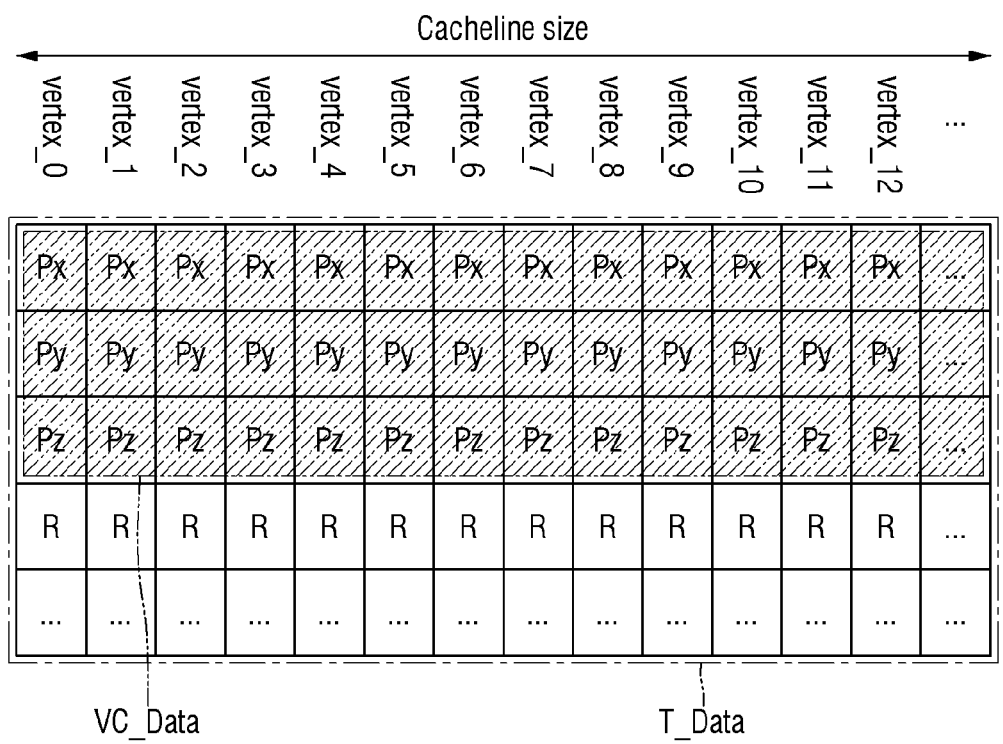

FIG. 6 is a conceptual diagram illustrating an exemplary source data structure and FIG. 7 is a conceptual diagram illustrating an exemplary destination data structure. Further, it is assumed that the computing resource device 30 is a Graphic Processing Unit (GPU).

Thus, the source data stored in the storage medium 200 is assumed to have the structure shown in FIG. 6. Here, the source data may have a structure in which a vertex is arranged in the vertical direction, and components Px, Py and Pz of a first attribute, components R, G, and B of a second attribute, components Nx, Ny and Nz of a third attribute, components S1 and S2 of a fourth attribute, and components T1 and T2 of a fifth attribute are respectively arranged in the horizontal direction. In this manner, the source data may be understood as being arranged in relation to the vertex.

In contrast, destination data compatible with the computing resource device 30 may have the structure illustrated in FIG. 7. That is, the destination data may have a structure in which the vertex is arranged in the horizontal direction, and components of the first through fifth attributes described in relation to FIG. 6 are arrange in the vertical direction.

Accordingly, components VC_Data of the first attribute may be visibility check data of the source data. The computing resource device 30 requires components of the first attribute of vertex (vertex)_0, vertex (vertex)_1, and vertex (vertex)_2 to determine whether the source data is visible on the screen. Alternately, when the storage medium 200 reads data in the horizontal direction in accordance with an established operating method, the storage medium 200 reads the data in units of cache line. That is, the storage medium 200 reads not only the visibility check data VC_Data for each vertex, but also the remaining data R to T2 of the corresponding vertex.

When the source data read from the storage medium 200 is sent "as-is", the storage medium 200 must read the entire source data (T_Data) including the invisible data, while accessing each vertex in order to send the visibility data (VC_Data) required by the computing resource device 30. However, storage devices according to embodiments of the inventive concept adaptively perform data reorganization on the source data in relation to the destination data, and thereby output the data having the required attributes with a minimum number of data access operation and without repeatedly reading the entire source data including the invisible data.

FIG. 8 is a table further illustrating the source data structure of FIG. 6, and FIG. 9 is a table further illustrating the destination data structure of FIG. 7.

Here, it is assumed that a command received by the storage device 10 includes metadata indicating information conceptually illustrated in FIG. 8. For example, the metadata may describe source data including 100 vertices (or 2000 bytes), wherein each vertex includes 20 bytes, and 3 attributes (e.g., a first attribute including three components, a second attribute including four components, and a third attribute including two components. An offset, a stride, and/or a component size for each attribute may also be included.

For example, the first attribute may correspond to the position data corresponding to Px, Py, Pz and in contrast to FIG. 6. A first component Position[0] of the first attribute may correspond to Px (vertex)_0 of FIG. 6, and since it has a base address, the offset is 0 byte, and the stride up to the next offset component Px (vertex)_1 is 20 bytes, and the component size of Px is 2 bytes. A second component Position[1] of the first attribute may correspond to Px (vertex)_1 of FIG. 6, the offset from the base address is 2 bytes, the stride up to the next offset component Px (vertex)_2 is 20 bytes, and the component size of Px is 2 bytes.

Similarly, a first component Color [0] of the second attribute may correspond to R (vertex)_0 of FIG. 6, the offset from the base address is 8 bytes, the stride up to the next offset component R (vertex_1) is 20 bytes, and the component size of R is 1 byte.

A first component Normal [1] of a third attribute may correspond to a texture coordinate T (vertex)_0 of FIG. 6, the offset from the base address is 16 bytes, the stride up to the next offset component T (vertex)_1 is 20 bytes, and the component size of T is 4 bytes.

The destination data structure may be expressed in a similar manner. Referring to FIG. 9, the destination data also has a source data in which the number of vertices is 100 (or 2000 bytes), each vertex is 20 bytes, and the number of attributes is 3, commonly to the source data in the metadata. That is, the first attribute includes three components, the second attribute includes four components, and the third attribute includes two components. Also, an offset, a stride, and a component size for each attribute may be included.

However, since vertex directions are different between FIGS. 8 and 9, the offset and stride for each component may be different. For example, since the first component Position [0] of the first attribute may corresponds to Px (vertex)_0 of FIG. 7 and has a base address, the offset is 0 byte, the stride up to the next offset component Px (vertex)_1 is 0 byte, and the component size of Px is 2 bytes. The second component Position[1] of the first attribute may correspond to Px (vertex)_1 of FIG. 7, the offset from the base address is 200 bytes, the stride up to the next offset component Px (vertex)_2 is 00 byte, and the component size of Px is 2 bytes.

Similarly, the first component Color [0] of the second attribute may correspond to R (vertex)_0 of FIG. 7, the offset from the base address is 800 bytes, the stride up to the next offset component R (vertex_1) is 0 byte, and the component size of R is 1 byte.

The first component Normal [1] of the third attribute may correspond to the texture coordinate T (vertex)_0 of FIG. 7, the offset from the base address is 1600 bytes, the stride up to the next offset component T (vertex_1) is 0 byte, and the component size of T is 4 bytes.

Accordingly, the storage medium 200 may reorganize and store data in the buffer 300 on the basis of not only source data address(es) and destination data derived from the command, but also data structure information described in relation to FIGS. 6, 7, 8 and 9. It follows that the buffer 300 may store reorganized destination data and then export same to the computing resource device 30 according to a preset unit (e.g., a page granularity).

In some embodiments, the storage medium 200 may further include format conversion information relevant to the performing of a data reorganization operation. Here, the format conversion information may be information in the form of a table related to an offset difference and a stride difference between the source data and the destination data. For example, the storage device 10 may store a format conversion table in which attribute types, number of attributes, number of components for each attribute, offsets, strides, and component sizes between the source data and the destination data are mapped to each other, extract the format conversion information included in the command, and perform the data reorganization on the basis of the values based on the format conversion information extracted from the format conversion table.

Alternately, the format conversion information may be information in the form of an arithmetic expression or a function describing an offset difference and a stride difference between the source data and the destination data. For example, the storage device 10 may store a function or an arithmetic expression of the attribute types, the number of attributes, the number of components for each attribute, the offsets, the strides, and the component sizes between the source data and the destination data, extract the format conversion information included in the command, and apply the extracted information to the function or the arithmetic expression to perform the data reorganization.

FIG. 10 is a table illustrating a scoreboard according to embodiments of the inventive concept.

Referring to FIGS. 1, 2, 3 and 10, the data loading unit 120 may further include a scoreboard. The scoreboard may be used to identify factors for the data reorganization of the storage device 10 and track updated factors or events. In some embodiments, the scoreboard may be implemented using one or more flip-flop(s).

The scoreboard indicates whether the reorganization of the destination data corresponding to the destination address has been completed. Thus, in some embodiments, the scoreboard may include component IDs, a destination address, a source address, a sending count, a receiving count, and valid information as entries. The data loading unit 120 may determine progress of the data reorganization operation with reference to the scoreboard, and export the destination data to the computing resource device 30.

That is, when the storage device 10 receives the command, the scoreboard records the component ID for each attribute, the destination address, and the corresponding source address, as a decoding result of the command. When all the components having any one destination address (e.g., Destination Addr 0) among the destination addresses are read, the storage device 10 reports that the data reorganization operation for the current destination address is completed, and reports that the data reorganization operation for the current destination address is completed, and updates the sending count, while starting the data reorganization operation of the next destination address (Destination Addr 200) (for example, updating the sending count of Destination Addr 200 from 0 to 1).

The data reorganizing unit 100 sends the destination data that is reorganized in the buffer 300 to the data transfer unit 130, and when the data transfer unit 130 receives the sent destination data, the data loading unit 120 generates the Ack signal, and the scoreboard updates the receiving count (for example, updating the receiving count of the Destination Addr 200 from 0 to 1).

When the sending count and the receiving count becomes equal (Sending count=Receiving count=1), the scoreboard considers that the components (e.g., Position[1] etc.) belonging to the destination address (e.g., Destination Addr 200) are completely reconfigured, and updates the valid information (changes from F to T).

In this manner, once all the values of all the components are filled, since all the valid information become T for the destination address, the storage device 10 may determine that the data reorganization is completed. According to such a determination, the storage device 10 may repeat the aforementioned procedure again, while changing to the next destination address again.

Figure 11:
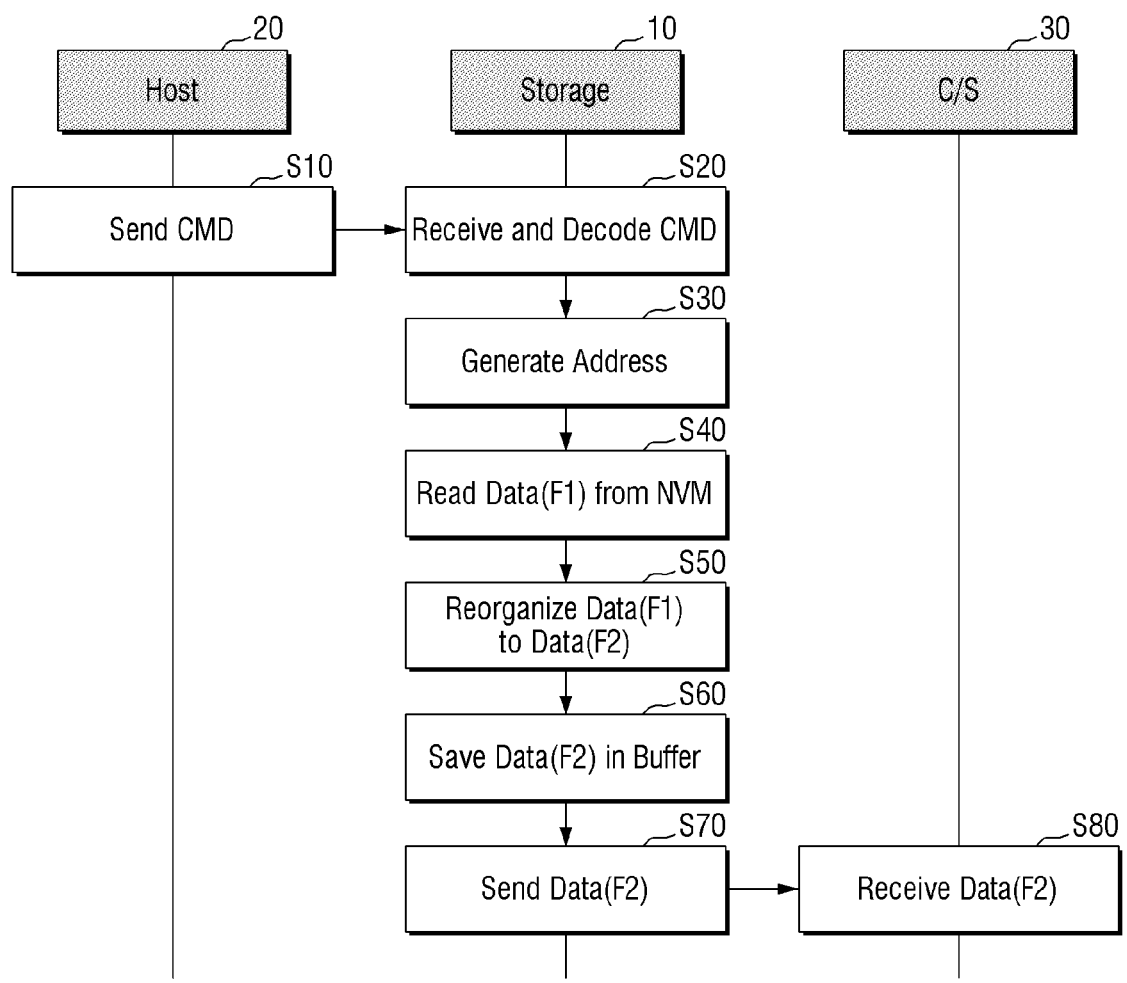
FIG. 11 is a flow diagram illustrating operation of a system according to embodiments of the inventive concept.
Figure 12:
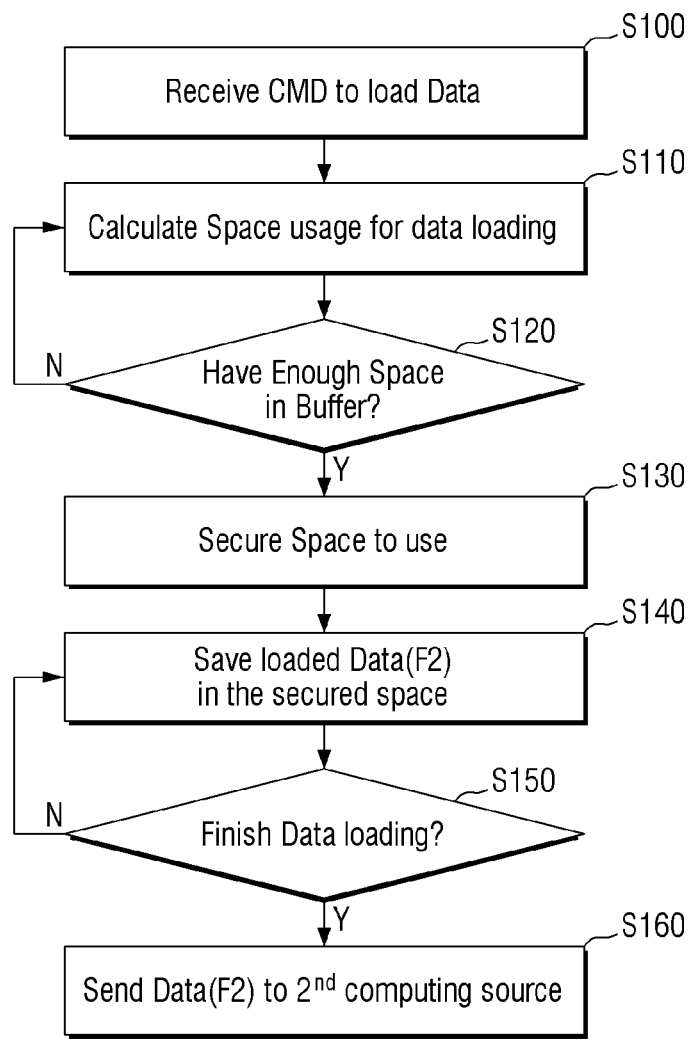
FIG. 12 is a flowchart illustrating in one example an operating method for a storage device according to embodiments of the inventive concept.

FIG. 11 is a flow diagram illustrating an operating method of an electronic system including a storage device according to embodiments of the inventive concept, and FIG. 12 is a flowchart illustrating an operating method for storage device according to embodiments of the inventive concept.

Referring to FIGS. 1, 2, 11 and 12, the storage device 10 receives a command (CMD) communicated from the host device 20 (S10, S20). The storage device 10 may decode the command to extract the source address, destination address, and metadata. The metadata may include a source data structure and a destination data structure. In some embodiments, the metadata may include a number of vertexes, a number of attributes, a number of components for each attribute, offset(s), stride (s) and component sizes of each of the source data and the destination data.

The storage device 10 rearranges the order of the source addresses in relation to the destination address (S30). The storage device 10 may determine whether sufficient available memory space exists in the buffer 300, and on the basis of the size of the destination data, rearrange the order of the source addresses. Referring to FIG. 12, the storage device 10 may calculate a size of the destination data to be reorganized and compares same with the currently available memory space of the buffer 300 (e.g.) using the start address and the last address of the destination address and the destination data structure (S110).

When available memory space is insufficient (S120=N), the storage device 10 may stop the source address rearrangement operation (S110). After that, when the sufficient memory space becomes available in the buffer 300, the source address rearrangement operation (S110) is resumed. And when there is a sufficient available memory space in the buffer 300 (S120=Y), the storage device 10 secures the available space (S130), reads the source data F1 from the storage medium 200 (S40), and reorganizes the destination data F2 for each component (S50). The storage device 10 stores the reorganized destination data F2 in the secured available space of the buffer (S140, S60).

The storage device 10 may repeat operation S140, until all components associated with the current destination address are filled (S150=N). Then, when all components of the current destination address are filled (S150=Y), the storage device 10 may export the destination data associated with of the current destination address to the computing resource device 30 (S160, S70). And the computing resource device 30 may receive the destination data (S80).

FIG. 13 is a block diagram illustrating an electronic system 1000 including at least one storage device according to embodiments of the inventive concept.

The system 1000 may be implemented as a mobile system, such as a mobile phone, a smart phone, a tablet PC, a wearable device, a healthcare device or an IoT device. Alternately, the system 1000 may be implemented a desktop PC, a laptop computer, a server, a media player, or an automotive device, such as a navigation system.

Referring to FIG. 13, the system 1000 may include a main processor 1100, memories 1200a and 1200b, and storage devices 1300a and 1300b, and may additionally include one or more of an image capturing device 1410, a user input device 1420, a sensor 1430, a communication device 1440, a display 1450, a speaker 1460, a power supplying device 1470, a connecting interface 1480, a GPU 1500, and an NPU 1600.

The main processor 1100 may control the overall operations of the system 1000, more specifically, the operations of other constituent elements that make up the system 1000. Such a main processor 1100 may be implemented as a general purpose processor, a dedicated processor, an application processor, or the like.

The main processor 1100 may include one or more CPU cores 1110, and may further include a controller 1120 for controlling the memories 1200a and 1200b and/or the storage devices 1300a and 1300b. Depending on design, the main processor 1100 may further include an accelerator block 1130, which is a dedicated circuit for a high-speed data computation such as an AI data computation. Such an accelerator block 1130 may include a Data Processing Unit (DPU), or the like, and may be implemented as separate chips that are physically independent of other constituent elements of the main processor 1100.

The memories 1200a and 1200b may be used as a main memory unit of the system 1000, and may include a volatile memory such as an SRAM and/or a DRAM, but may also include a non-volatile memory such as a flash memory, a PRAM and/or a RRAM. The memories 1200a and 1200b may also be implemented inside the same package as the main processor 1100.

The storage devices 1300a and 1300b may function as non-volatile storage devices for storing data regardless of whether a power is supplied, and may have a relatively larger capacity than the memories 1200a and 1200b. The storage devices 1300a and 1300b may include storage controllers 1310a and 1310b, and non-volatile memory (NVM) storages 1320a and 1320b that store data under the control of the storage controllers 1310a and 1310b. The non-volatile storages 1320a and 1320b may include a V-NAND flash memory of a two dimensional (2D) structure or a 3D structure, but may also include other types of non-volatile memory such as a PRAM and/or a RRAM. Here, the storage devices 1300a and 1300b may be storage devices consistent with the foregoing embodiments.

The storage devices 1300a and 1300b may be included in the system 1000 in a state of being physically separated from the main processor 1100, and may be implemented inside the same package as the main processor 1100. Further, since the storage devices 1300a and 1300b have a shape such as a solid state device (SSD) or a memory card, the storage devices 1300a and 1300b may also be detachably coupled with other constituent elements of the system 1000 through an interface such as a connecting interface 1480 to be described below. Such storage devices 1300a and 1300b may be, but are not necessarily limited to, devices to which standard protocols such as a UFS, an eMMC or an NVMe may be applied.

The image capturing device 1410 may capture still images or moving images, and may be a camera, a camcorder, and/or a webcam and the like.

The user input device 1420 may receive various types of data that are input from users of the system 1000, and may be a touch pad, a key pad, a keyboard, a mouse and/or a microphone.

The sensor 1430 may detect various types of physical quantities that may be acquired from the outside of the system 1000, and convert the detected physical quantities into electrical signals. Such a sensor 1430 may be a temperature sensor, a pressure sensor, an illuminance sensor, a position sensor, an acceleration sensor, a biosensor and/or a gyroscope sensor.

The communication device 1440 may transmit and receive signals to and from other devices outside the system 1000 according to various communication protocols. Such a communication device 1440 may be implemented to include an antenna, a transceiver and/or a modem and the like.

The display 1450 and the speaker 1460 may each function as output devices that output visual and auditory information to the user of the system 1000.

The power supplying device 1470 may appropriately convert the power supplied from a battery (not shown) equipped in the system 1000 and/or an external power supply and supply the power to each constituent element of the system 1000.

The connecting interface 1480 may provide a connection between the system 1000 and an external device that may be connected to the system 1000 to transmit and receive data to and from the system 1000. The connecting interface 1480 may be implemented by various interface types, such as an Advanced Technology Attachment (ATA), Serial ATA (SATA), an external SATA (e-SATA), a Small Computer Small Interface (SCSI), a Serial Attached SCSI (SAS), a Peripheral Component Interconnection (PCI), a PCI express (PCIe), a NVMe, an IEEE 1394, a USB, an secure digital (SD) card, a multi-media card (MMC), an eMMC, a UFS, an eUFS, and a compact flash (CF) card interface.

The GPU 1500 may process graphics APIs such as OpenGL ES and OpenCL (CUDA) to achieve a gorgeous graphics effect in the electronic device. The GPU 1500 may receive an address from the CPU 1100 according to some embodiments, read data from any of the storage devices 1300a and 1300b using the received address, and perform the graphic processing on the data. The storage devices 1300a and 1300b may read the data (e.g., graphics data) stored in at least one non-volatile memory 1320a and 1320b in response to the read request that is output from the CPU 1100 or the GPU 1500, and send the read data to the corresponding configuration 1100 or 1500. The storage devices 1300a and 1300b may request a write request that is output from the CPU 1100 or GPU 1500, and write data (e.g., graphics data) output from the corresponding configuration 1100 or 1500 to the non-volatile memories 1320a and 1320b.

The GPU 1500 may include one or more GPU cores 1510 and a GPU memory 1520 according to some embodiments. The GPU core 1510 may include highly programmable advanced parallel computing engine sets and various fixed function units. The GPU memory 1520 may store data to be sent from the storage devices 1300a and 1300b or for being sent thereto, or may store data processed by the GPU core 1510.

The neural processing unit (NPU) 1600 may be a processor that is optimized for parallel computing related to artificial intelligence. The NPU 1600 is a processing device for performing the processing operations on security data, multimedia data, and data of a predetermined purpose in place of or in support of the main processor 1100, and may be provided as, for example, an Intellectual Property (IP) for improving the processing performance of text, audio, still images, animation, video, two-dimensional data, multi-dimensional data, and the like. The NPU 1600 may include an NPU core 1610 that performs a neural network computation, and an NPU memory 1620 that stores data processed by the NPU core.

According to some embodiments, the GPU 1500 and the NPU 1600 may have a data structure different from those of the storage devices 1300a and 1300b, and in this case, the storage device and the operating method thereof according to some of the above-described embodiments may be utilized.

Those skilled in the art will appreciate that many variations and modifications may be made to the illustrated embodiments without substantially departing from the scope of the inventive concept, as defined by the following claims.

What is claimed is:

1. An electronic system comprising:
a host configured to provide a command and source data having a source data structure, the command comprising a source address and a destination address;
a computing resource device configured to operate in relation to destination data, the destination data having a destination data structure different from the source data structure; and
a storage device configured to receive the command from the host,
wherein the storage device includes:
a storage medium including at least one non-volatile memory device and configured to store the source data; and
a data reorganizing unit configured to convert the stored source data into reorganized source data; and
wherein the storage device is configured to output the reorganized source data to the computing resource device as the destination data,
wherein the data reorganizing unit is configured to rearrange an order of the source address according to the destination address, and read at least one component according to at least one attribute from the rearranged address in the storage medium, and
wherein the reorganized source data is replaced with the at least one read component according to the destination data structure as the destination data.

2. The electronic system of claim 1, wherein the storage device further comprises:
a command decoder configured to decode the command and extract the source address, the source data structure, the destination address, and the destination data structure;
an address generator configured to rearrange an access order of the source address in relation to the destination address, generate a rearranged source address, and provide the destination address and the rearranged source address;
a data loading unit configured to receive the rearranged source address and read the source data from the storage medium in relation to the rearranged source address; and
a buffer configured to reorganize and store components of the source data to generate the destination data; and
a data transfer unit configured to export the destination data to the computing resource device in accordance with the destination address.

3. The electronic system of claim 2,
wherein the storage device further comprises: a scoreboard circuit configured to track reorganization of the source data during generation of the destination data, store the destination address and the source address, and map the sending count and the receiving count in relation to the components of the source data.

4. The electronic system of claim 3,
wherein the scoreboard circuit is further configured to adjust the sending count by increasing the sending count related to a first component when a component ID for a first component among the components of the source data, the destination address, and the source address are output to the data loading unit, and wherein the scoreboard circuit is further configured to adjust the receiving count by increasing the receiving count related to the first component when the component ID of the first component and an acknowledge signal related to the first component are received from the data loading unit.

5. The electronic system of claim 2, wherein the data loading unit is configured to:
store the rearranged source address in a queue in an input order;
read the source data corresponding to the source address, as output from the queue, from the storage medium;
arrange the source data for each component at a corresponding position of the destination data structure; and
store the arranged source data in the buffer.

6. The electronic system of claim 5, wherein the data loading unit is further configured to send a completion signal to the data transfer unit and communicate an acknowledge signal to the address generator when all components of the destination address stored in the buffer are filled.

7. The electronic system of claim 6, wherein the data transfer unit is configured to export destination data stored in the buffer to the computing resource device in accordance with a page granularity.

8. The electronic system of claim 2, wherein the address generator is configured to:
receive the destination address and the rearranged source address from the command decoder; and
determine whether or not sufficient available memory space exists in the buffer in relation to the destination address before reorganizing and storing components of the source data to generate the destination data.

9. A storage device comprising:
a storage medium including at least one non-volatile memory device, configured to store source data having a source data structure in relation to a source address; and
a data reorganizing unit configured to read the source data from the at least one non-volatile memory device in response to a command, reorganize the source data into destination data having a destination data structure and related to a destination address, and
output the destination data to a computing resource device operating in relation to the destination data structure,
wherein the command includes the source address, the destination address, and metadata,
wherein the data reorganizing unit is further configured to reorganize components of the source data to generate reorganized source data, and output the reorganized source data as the destination data, and
wherein the source data has a vertex arranged in a first direction and at least one component arranged in a second direction and the destination data has a vertex arranged in the second direction and at least one component arranged in the first direction.

10. The storage device of claim 9, wherein the data reorganizing unit is further configured to:
rearrange an access order for the source address in accordance with the destination address;
read the source data from the storage medium in accordance using with the rearranged access order for the source address; and
read source data for each component of the destination address.

11. The storage device of claim 9, wherein the metadata includes a number of vertices, a number of attributes, a number of components for each attribute, a component size, an offset for each component of the source data, a stride for each component of the source data, an offset for each component of the destination data, and a stride for each component of the destination data.

12. The storage device of claim 11, wherein the metadata further includes format conversion information associated with the source data and the destination data.

13. The storage device of claim 9,
wherein the data reorganizing unit is further configured to perform a rearranging operation that rearranges an access order for the source address in accordance with the destination address, and
wherein the rearranging operation includes:
determining whether available memory space in a buffer is sufficient or insufficient to store the destination data in relation to the destination address;
stopping the rearranging operation upon determining that available memory space in the buffer is insufficient; and
after stopping the rearranging operation, resuming the rearranging operation upon determining that available memory space in the buffer is sufficient.

14. The storage device of claim 13,
wherein the data reorganizing unit comprises: a scoreboard circuit configured to track rearranging of the access order for the source data, and
wherein the scoreboard circuit is configured to store the destination address and the source address, track a sending count and a receiving count, and map the sending count and the receiving count in relation to components of the source data.

15. The storage device of claim 14,
wherein the scoreboard circuit is further configured to adjust the sending count when all components of the source address corresponding to the destination address are read, and
wherein the scoreboard circuit is further configured to adjust the receiving count when all components of the source address corresponding to the destination address are read and output to the computing resource device.

16. The storage device of claim 15, wherein valid information associated with a component of the destination address is updated when the sending count and the receiving count are equal.

17. An operating method of a storage device, comprising:
receiving a command from a host device;
decoding the command to extract information about a source address, a destination address, and a data structure;
rearranging an access order of the source address according to the destination address;
reading source data from a non-volatile memory device included in a storage medium in accordance with the rearranged access order of the source address;
reorganizing the source data into destination data for each component on a basis of the data structure; and
outputting the destination data to a computing resource device; and
wherein the reading source data includes reading at least one component according to at least one attribute from the rearranged address,
wherein the reorganizing the source data includes replacing the at least one read component according to the destination data structure, and
wherein the destination data structure has different vertex direction with the source data structure.

18. The operating method of the storage device of claim 17, wherein information about the data structure includes a number of vertices, a number of attributes, a number of components for each attribute, an offset for each component, a stride for each component, and a size for each component on each of a source data structure and a destination data structure.

19. The operating method of the storage device of claim 17, wherein the storage device includes a buffer configured to map a request ID according to the command and the destination address and the source address and store the destination data reorganized for each component.

20. The operating method of the storage device of claim 17, wherein the rearranging the access order includes placing of the source address corresponding to the destination address into an input queue and outputting of the source address in an order by which the source address has been placed in the input queue.

* * * * *